United States Patent
Watanabe (10) Patent No.: US 8,711,802 B2
(45) Date of Patent: Apr. 29, 2014

(54) COMMUNICATION APPARATUS, AND METHOD AND PROGRAM FOR CONTROLLING SAME

(75) Inventor: Kazunari Watanabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 431 days.

(21) Appl. No.: 12/757,419

(22) Filed: Apr. 9, 2010

(65) Prior Publication Data

US 2010/0296503 A1 Nov. 25, 2010

(30) Foreign Application Priority Data

May 21, 2009 (JP) ................................ 2009-123542

(51) Int. Cl.
*H04W 4/00* (2009.01)

(52) U.S. Cl.
USPC ........... 370/330; 370/329; 370/319; 370/320; 370/321; 370/322

(58) Field of Classification Search
USPC .......... 370/310–350, 206–208; 455/450–455, 455/463, 464, 509
See application file for complete search history.

(56) References Cited

U.S. PATENT DOCUMENTS

| | | | |
|---|---|---|---|
| 2002/0131371 A1* | 9/2002 | Rudnick | 370/252 |
| 2005/0063349 A1* | 3/2005 | LoGalbo et al. | 370/338 |
| 2008/0095290 A1* | 4/2008 | Leung | 375/371 |
| 2008/0117810 A1* | 5/2008 | Stott et al. | 370/230 |
| 2008/0151849 A1* | 6/2008 | Utsunomiya et al. | 370/338 |
| 2010/0284380 A1* | 11/2010 | Banerjee et al. | 370/338 |

FOREIGN PATENT DOCUMENTS

| | | |
|---|---|---|
| JP | 2008-160758 | 7/2008 |
| JP | 2008-172763 A1 | 7/2008 |
| WO | 2008/012766 A2 | 1/2008 |

OTHER PUBLICATIONS

IEEE Std 802.11e-2055, Nov. 11, 2005; pp. 1-189.*
The above references were cited in a Feb. 18, 2013 Japanese Office Action, which is enclosed without an English Translation, that issued in Japanese Patent Application No. 2009-123542.

* cited by examiner

*Primary Examiner* — Andrew Chriss
*Assistant Examiner* — Kenan Cehic
(74) *Attorney, Agent, or Firm* — Cowan, Liebowitz & Latman, P.C.

(57) ABSTRACT

A communication apparatus communicates by switching between a first communication period in which contention access control is performed and a second communication period in which non-contention access control is performed. The apparatus determines the state of access contention in the first communication period, changes the frequency bandwidth of the first or second communication period in accordance with the determination and changes the time ratio between the first communication period and the second communication period in accordance with the change of frequency bandwidth.

14 Claims, 8 Drawing Sheets

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 10 | 20μS | Voice | ○ |
| 0 | 0 | Video | ○ |
| 0 | 0 | Best Effort | ○ |
| 3 | 120μS | Background | ○ |

FIG. 5

STA102

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 10 | 20μS | Voice | ○ |
| 0 | 0 | Video | ○ |
| 0 | 0 | Best Effort | ○ |
| 3 | 120μS | Background | ○ |

STA103

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 8 | 25μS | Voice | ○ |
| 0 | 0 | Video | ○ |
| 0 | 0 | Best Effort | ○ |
| 1 | 80μS | Background | ○ |

STA104

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 0 | 0 | Voice | × |
| 0 | 0 | Video | × |
| 35 | 50μS | Best Effort | × |
| 0 | 0 | Background | × |

STA105

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 0 | 0 | Voice | ○ |
| 120 | 65μS | Video | ○ |
| 0 | 0 | Best Effort | ○ |
| 0 | 0 | Background | ○ |

STA106

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 0 | 0 | Voice | × |
| 0 | 0 | Video | × |
| 5 | 30μS | Best Effort | × |
| 0 | 0 | Background | × |

OVERALL SYSTEM

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| 18 | 21.1μS | Voice | ○ |
| 120 | 65μS | Video | ○ |
| 5 | 30μS | Best Effort | × |
| 4 | 110μS | Background | ○ |

| FREQUENCY OF OCCURRENCE OF DATA-TRANSMISSION WAIT PER UNIT TIME | AVERAGE VALUE OF DATA TRANSMISSION WAITING TIME | ACCESS CATEGORY | EDCA COMMUNICATION CONTROL |
|---|---|---|---|
| MORE THAN 3 TIMES | MORE THAN 10μS | Voice | 10mS |
| MORE THAN 10 TIMES | MORE THAN 20μS | Video | 10mS |
| MORE THAN 50 TIMES | MORE THAN 2000μS | Best Effort | 10mS |
| MORE THAN 100 TIMES | MORE THAN 10000μS | Background | 10mS |

COMMUNICATION APPARATUS, AND METHOD AND PROGRAM FOR CONTROLLING SAME

BACKGROUND OF THE INVENTION

1. Field of the Invention

The present invention relates to a communication apparatus and a method and program for controlling this apparatus.

2. Description of the Related Art

A communication system composed of a base station (or access point, referred to as an "AP" below) and a plurality of communication terminals (or stations, referred to as "STAs" below) is known in the art. In such a communication system, each STA communicates with other STAs or connects to an external network via the AP.

Technology for preventing a decline in communication quality as caused by access contention or the like in such a communication system has been proposed. For example, EDCA (Enhanced Distributed Channel Access) and HCCA (HCF Controlled Channel Access) are available as control methods defined in IEEE 802.11e. EDCA is an access control method obtained by extending CSMA/CA. With EDCA, priority control is carried out in accordance with the order of priority of data. As a result, data having a high order of priority is transmitted in accordance with priority even in a case where access contention has occurred within the system.

HCCA is a control method that is an extension of a polling procedure. When communication starts, scheduling is carried out between an STA and AP in accordance with the type of data, taking the communication quality into consideration. Since scheduling is performed before the start of the data transmission in this control method, occurrence of access contention per se can be prevented.

Further, a control method of extending the communication band to the 40-MHz band is described in the draft of IEEE 802.11n. According to this control method, 20 MHz (the conventional communication band) is extended to 40 MHz, by way of example.

By way of example, a technique for controlling selection of a 20-MHz-only mode, 20/40-MHz mode and PCO mode described in the draft is known as a method of communication control that uses the technology mentioned above (Japanese Patent Laid-Open No. 2008-160758).

Also known is technology for giving notification of the frequency of occurrence of access contention. For example, according to a method defined in IEEE 802.11k, notification is given using information that has been set within a prescribed communication frame (Beacon frame body and Probe Response frame body). Specifically, "BSS Average Access Delay" information is used.

In the above-described communication system, assume that each STA is performing data communication with an external network or other STA continuously or periodically via an AP. Under these conditions, the problems set forth below arise if a further plurality of STAs issue connection requests to the AP so that the number of STAs using this AP increase.

If the sum total of communication bands requested by the STAs exceeds a prescribed amount in an EDCA communication period, there are cases where the communication band will be inadequate, even if priority control is carried out, and hence it will not be possible to assure the desired transmission rate.

Further, even in a case where the sum total of communication bands requested by the STAs is small, there are instances where data transmission waiting time due to access contention increases and the real-time nature of the data transmission cannot be assured when data transmission has been requested by a plurality of STAs of the same order of priority.

On the other hand, the HCCA communication period is such that access contention does not arise in this communication period because management and scheduling are performed by the AP. However, even if a new STA attempts to participate in communication during the HCCA communication period, this STA will not be able to communicate with the AP unless there is an availability in the communication band. Further, in an instance where an STA for which the order of priority of data communication is higher than that of an STA already in the connected state, a case where the STA having the higher order of priority is connected preferentially over the existing STA is conceivable.

In a known technique, if the sum total of communication bands requested by each of the STAs exceeds a prescribed amount, the communication band is extended in order to deal with data transmission requests issued by each of the STAs. However, if the communication band is extended (from the 20-MHz band to the 40-MHz band, for example) in the entire communication period, a problem may arise. For example, if there is another communication system nearby, there are instances where the radio channels interfere with each other.

In general, the frequency characteristic of a radio channel is not ideal. Consequently, a wireless terminal (STA) leaks power to an adjacent radio channel. In such cases there are instances where leakage power is detected as the carrier owing to application of the CSMA/CA scheme. In other words, if there is another communication system nearby, radio channels interfere with one another and the result is a decline in the communication band itself. If the frequency bands of two channels are used owing to extension of the communication band, this problem becomes even more pronounced and there are instances where radio channels equivalent to four channels are detected as the carrier owing to the inclusion of radio channels adjacent above and below.

SUMMARY OF THE INVENTION

The present invention suppresses interference with adjacent channels and reduces the occurrence of access contention.

According a first aspect of the present invention, there is provided a communication apparatus comprising: a communication unit configured to communicate by switching between a first communication period in which contention access control is performed and a second communication period in which non-contention access control is performed; a determination unit configured to determine the state of access contention in the first communication period; a first changing unit configured to change frequency bandwidth of the first or second communication period in accordance with the determination made by the determination unit; and a second changing unit configured to change a time ratio between the first communication period and the second communication period in accordance with the change of frequency bandwidth by the first changing unit.

According a second aspect of the present invention, there is provided a method of controlling a communication apparatus for communicating by switching between a first communication period in which contention access control is performed and a second communication period in which non-contention access control is performed, comprising the steps of: determining the state of access contention in the first communication period; changing frequency bandwidth of the first or second communication period in accordance with the determination result; and changing a time ratio between the first communication period and the second communication period in accordance with the change of frequency bandwidth.

According a third aspect of the present invention, there is provided a program for causing a computer, which is incorporated within a communication apparatus for communicating by switching between a first communication period in which contention access control is performed and a second communication period in which non-contention access control is performed, to function as: a determination unit configured to determine the state of access contention in the first communication period; a first changing unit configured to change frequency bandwidth of the first or second communication period in accordance with the determination made by the determination unit; and a second changing unit configured to change a time ratio between the first communication period and the second communication period in accordance with the change of frequency bandwidth by the first changing unit.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiments of the present invention will now be described in detail with reference to the accompanying drawings.

In the embodiments that follow, a case will be described in which communication is performed using various related standards that include the IEEE 802.11 standard and extensions thereof (IEEE 802.11n, IEEE 802.11e, IEEE 802.11k). It should be noted that the invention is not limited to communication using such standards and communication may just as well be in accordance with communication protocols other than these.

Figure 1:
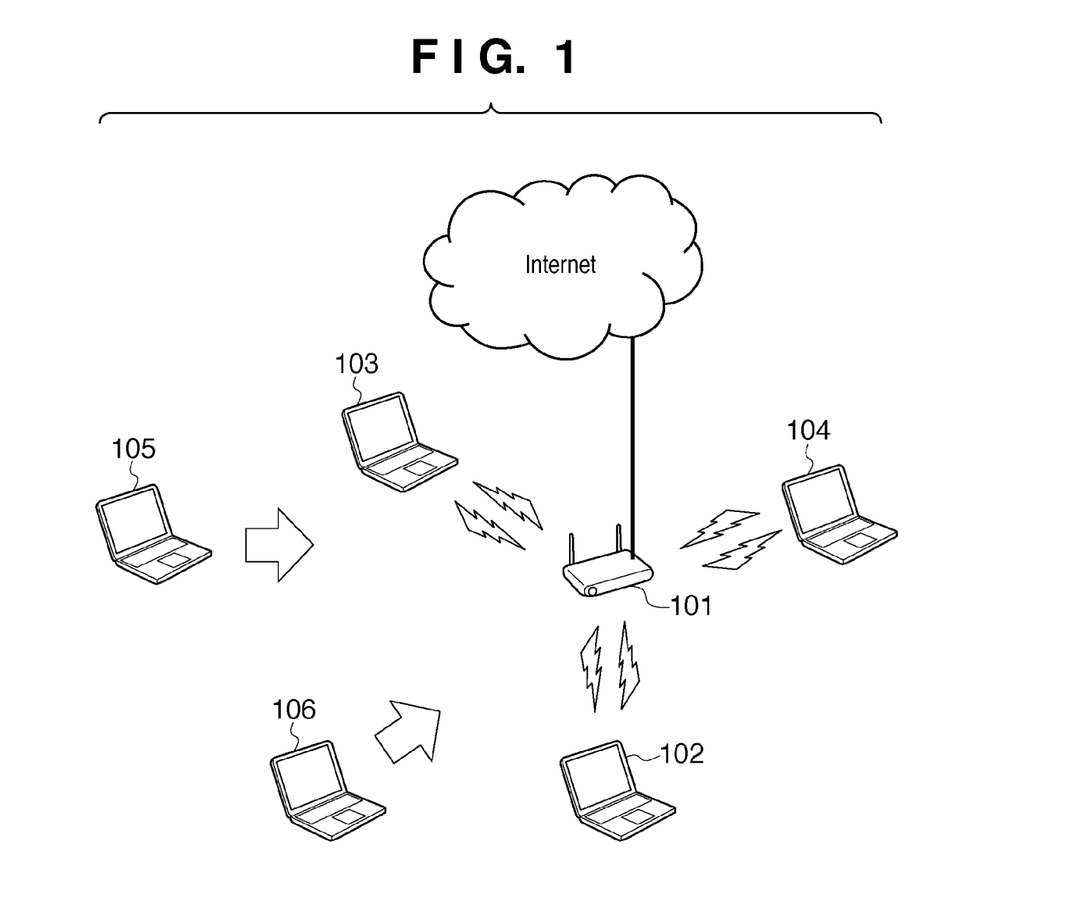
FIG. 1 is a diagram illustrating an example of the configuration of a communication system according to an embodiment of the present invention.

FIG. 1 is a diagram illustrating an example of the configuration of a communication system according to an embodiment of the present invention. This communication system comprises a base station (referred to as an "AP" below) 101 and a plurality of communication terminals (referred to as "STAs" below) 102 to 106 is known in the art. The STAs 102 to 106 communicate with other STAs or connect to an external network (the Internet, for example) via the AP 101.

The AP 101 (communication control terminal) controls the communication performed by the STAs 102 to 106 using a plurality (two in this embodiment) of communication control schemes. The AP 101 according to this embodiment controls the communication performed by the STAs 102 to 106 using EDCA (a first communication control scheme) for exercising contention access control and HCCA (a second communication control scheme) for exercising non-contention access control. It should be noted that communication control according to EDCA and HCCA is carried out using separate communication bands in different communication periods, by way of example.

In the state illustrated in FIG. 1, the STAs 102 to 104 have already established communication with the AP 101 and the STAs 105 and 106 have issued connection requests to the AP 101 in order to be connected to the AP 101. The foregoing is a description of an example of the overall configuration of the communication system.

Figure 2:
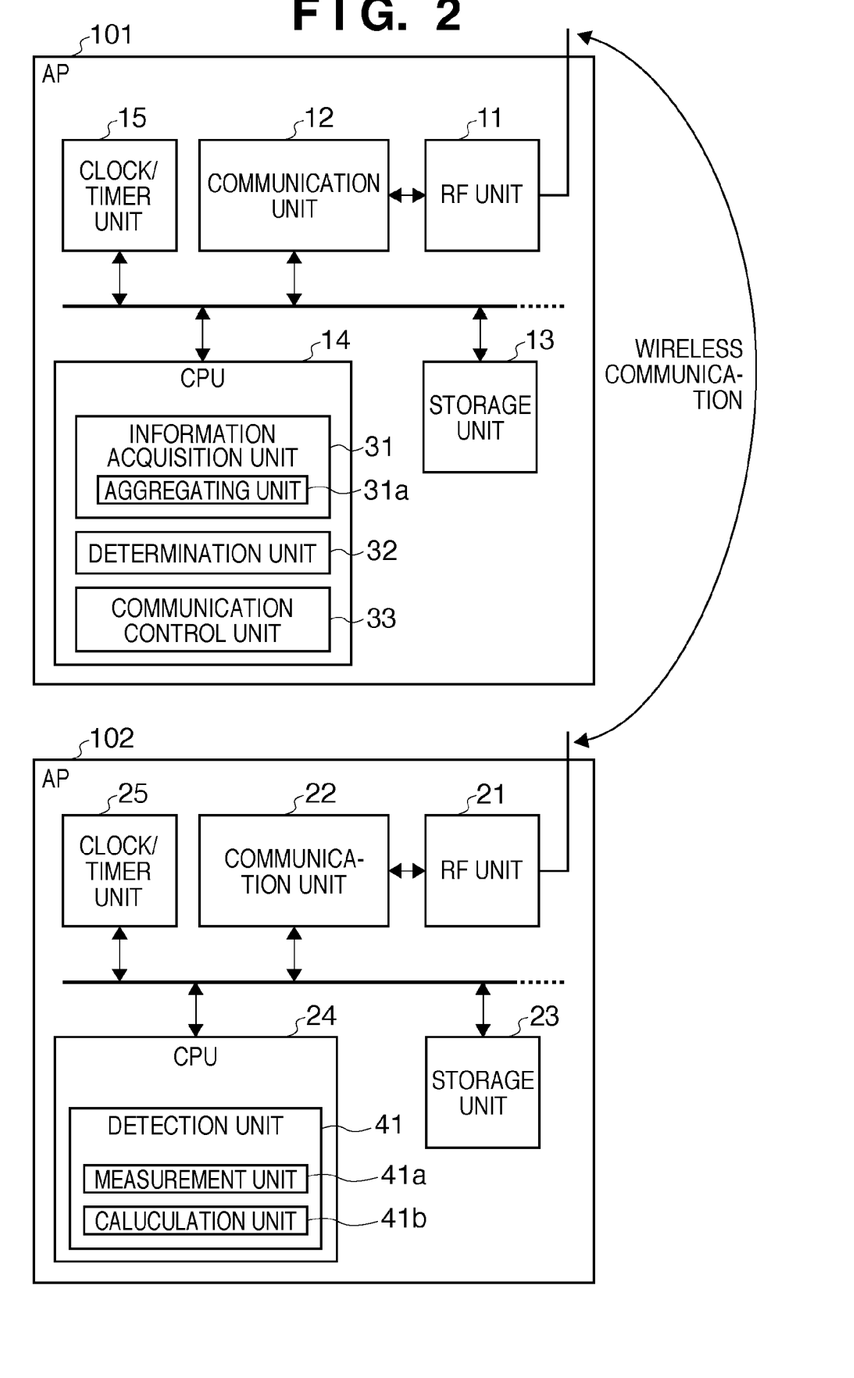
FIG. 2 is a diagram illustrating an example of the functional structures of an AP 101 and STAs 102 to 106 shown in FIG. 1.

Next, an example of the functional structures of the AP 101 and STAs 102 to 106 shown in FIG. 1 will be described with reference to FIG. 2. This will be described taking as an example the functional components that implement the wireless communication function. It should be noted that although the STA components are described taking the STA 102 as a representative example, the other STAs 103 to 106 have the same structure.

The structure of the AP 101 will be described first. The AP 101 includes an RF unit 11, a communication unit 12, a storage unit 13, a CPU 14 and a clock/timer unit 15. The communication unit 12 performs wireless communication in compliance with the drafts or standards of IEEE 802.11n, IEEE 802.11e, IEEE 802.11k. The RF unit 11 sends and receives radio signals to and from the STAs 102 to 106.

The storage unit 13, which comprises for example a RAM or flash ROM or the like, stores various data. By way of example, the storage unit 13 stores information related to access contention (referred to as "access contention information" below) such as data transmission waiting time (transmission waiting time). Further, the storage unit 13 stores, in correlated form, this access contention information, communication control information such as EDCA and HCCA, and information indicating the type of data transmitted, by way of example.

The clock/timer unit 15 has a timekeeping function (date and time) and a timer function for measuring a prescribed length of time. Based upon time information from the clock/timer unit 15, the CPU 14 recognizes the communication period of the communication control scheme currently being used in communication.

The CPU 14 performs overall control of processing related to communication. That is, the functional arrangement shown in FIG. 2 operates based upon control exercised by the CPU 14. Control by the CPU 14 is carried out in accordance with a program that has been stored in the storage unit 13, by way of example. Other functional components implemented in the CPU 14 include an information acquisition unit 31, a determination unit 32 and a communication control unit 33.

The information acquisition unit 31 acquires access contention information from the STAs 102 to 106 and stores this information in the storage unit 13. By way of example, the access contention information consists of information that includes at least one of data transmission waiting time, an average value of data transmission waiting time per unit time and number of times of occurrence (frequency of occurrence) of data-transmission wait per unit time. Further, the information acquisition unit 31 is internally provided with an aggregating unit 31*a*. The aggregating unit 31*a* aggregates the access contention information of the STAs and creates collective information of the entire system (referred to as "overall system information" below).

The determination unit 32 determines whether to execute communication control processing based upon the access contention information. Specifically, the determination unit 32 compares a prescribed threshold value and each item of access contention information (the average value of data transmission waiting time and the frequency of occurrence of data-transmission wait, for example) that has been stored in the storage unit 13 and makes the above-mentioned determination based upon the result of the comparison. That is, the AP 101 obtains the amount of generated access contention according to the access contention information and, based upon the comparison with the threshold value, ascertains whether communication quality has declined in accordance with the amount of contention generated.

The communication control unit 33 executes communication control processing based upon the result of the determination made by the determination unit 32. For example, the communication control unit 33 controls STA communication by changing over, within a unit time, the period (first communication period) in which communication control is executed by EDCA and the period (second communication period) in which communication control is executed by HCCA. At this time, based upon the result of the determination made by the determination unit 32, the communication control unit 33 changes the ratio (time ratio), within the unit time, between the length of time of the period in which communication control is executed by EDCA and the length of time of the period in which communication control is executed by HCCA.

The structure of the STA 102 will be described next. The STA 102 includes an RF unit 21, a communication unit 22, a storage unit 23, a CPU 24 and a clock/timer unit 25. It should be noted that since the RF unit 21, communication unit 22, storage unit 23, CPU 24 and clock/timer unit 25 perform functions similar to those described above with regard to the AP 101, these need not be described again. The description rendered below will focus on how the functions of the STA differ from those of the AP 101.

The CPU 24 is provided with a detection unit 41 as a functional component. The detection unit 41 detects the occurrence of access contention. Based upon notification from the RF unit 21 and communication unit 22, the detection unit 41 detects that transmission wait has occurred. Using time information from the clock/timer unit 25, a measurement unit 41*a* measures the time at which transmission wait occurred. This measurement is carried out by the CSMA/CA scheme. Based upon the result of this measurement, a calculation unit 41*b* calculates the average value or frequency of occurrence of data transmission waiting time per unit time. The detection unit 41 then stores access contention information in the storage unit 23. Specifically, the access contention information is information that is the result of correlating the transmission waiting time, average value (per unit time) and frequency of occurrence (per unit time), etc.

Next, an example of communication control processing by the AP 101 shown in FIG. 1 will be described with reference to FIG. 3. It will be assumed that each of the STAs 102 to 106 is communicating with an external network or the like via the AP 101.

The AP 101 causes the CPU 14 to determine whether a fixed period of time has elapsed or not. The determination as to whether the fixed period of time has elapsed or not is made based upon time information from the clock/timer unit 15. That is, the AP 101 checks for the occurrence of access contention whenever the fixed period of time elapses.

If the fixed period of time elapses ("YES" at step S101), then the AP 101 causes the information acquisition unit 31 to transmit a control signal (step S102). This is done in order to gather access contention information from each STA.

Next, the AP 101 determines whether a response to the control signal transmitted at step S102 has been received. If a response signal has been received ("YES" at step S103), the AP 101 causes the information acquisition unit 31 to acquire access contention information from the response signals received from each of the STAs. This access contention information is stored in the storage unit 13 (step S104). The AP 101 then causes the determination unit 32 to determine, based upon this access contention information, whether or not to perform communication control. This determination processing involves comparing, with a prescribed threshold value, the data transmission waiting time of the communication performed via the unit (the AP 101).

If the data transmission waiting time does not exceed the prescribed threshold value and communication control is not carried out ("NO" at step S105), the AP 101 causes processing to return to the processing of step S101. On the other hand, if the data transmission waiting time, for example, exceeds the prescribed threshold value and communication control processing is carried out ("YES" at step S105), then the AP 101 causes the communication control unit 33 to start communication control. This communication control involves extending the band in the EDCA communication period (step S106). Specifically, the communication control unit 33 extends (changes from 20 MHz to 40 MHz, by way example) the bandwidth of the radio channel used only in the period in which communication control by EDCA is being performed. Further, since the band in the EDCA period has been extended, the communication capacity in the EDCA period is enlarged and therefore the ratio, within the unit time, between the length of time of the period in which communication control is executed by EDCA and the length of time of the period in which communication control is executed by HCCA is changed. Specifically, the communication control unit 33 shortens the period in which communication control by EDCA is being performed and lengthens the period other than the EDCA period (the period in which communication control by HCCA is performed) (step S107). In other words, the communication control unit 33 changes the portion of the period in which communication control by EDCA is being performed to a period other than the EDCA period (the period in which communication control by HCCA is performed). This processing is then terminated.

The processing of steps S102 to S104 shown in FIG. 3 will now be described in detail. Specifically, the processing executed by the AP 101 for gathering access contention information from the STAs will be described.

In the case of the IEEE 802.11k standard, the average value of data transmission waiting time is set as a "BSS Average Access Delay element". Further, the average value of data transmission waiting time is set, for every data type, as a "BCC AC Access Delay element".

These "elements" are set within a "Beacon frame body" and "Probe Response frame body" defined as a "Management frame". Accordingly, by receiving a "Probe Response" or "Beacon" transmitted from an STA, the AP 101 gathers information such as data transmission waiting time.

It should be noted that there are also cases where there is no mechanism by which "Probe Response" or "Beacon" is transmitted from an STA. In such cases it will suffice to arrange it so that the information of "BSS Average Access Delay element" or "BCC AC Access Delay element" is set in a "Data frame" and the data frame containing this information is transmitted from the STA side.

Further, information such as the frequency of occurrence of data-transmission wait is not included in "BSS Average Access Delay element" or "BCC AC Access Delay element". Such information, therefore, is set in "Data frame" and transmitted on the STA side. The AP 101 need only extract the above-mentioned information from within "Data frame".

Next, an example of access contention information stored on the STA side (in storage unit 23) will be described with reference to FIG. 4. Here the description will be rendered taking STA 102 (storage unit 23) as an example.

The access contention information includes information such as information indicating whether communication is being performed in the EDCA communication period, the type of access category, the average value of data transmission waiting time, and the frequency of occurrence of data-transmission wait per unit time. The access contention information is updated during the communication period, by way of example. In terms of the frequency thereof, this is carried out at regular time intervals, by way of example.

Figure 4:
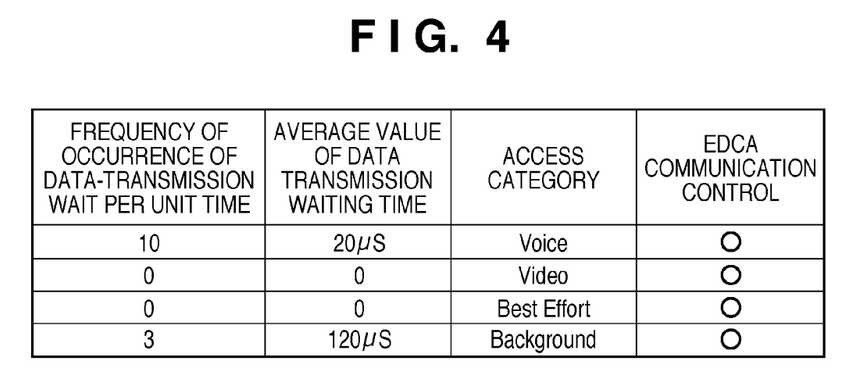
FIG. 4 is a diagram illustrating an example of access contention information stored on the STA side (storage unit 23)

In the access contention information shown in FIG. 4, communication control is being carried out using EDCA. The information indicates that data communication is in progress with the access categories being Voice and Background. The information indicates that, in each data communication, data-transmission wait occurs per unit time and that the frequencies of occurrence thereof are 10 times and tree times, respectively. Further, the information indicates that the average waiting times at occurrence of data-transmission wait are 20 μs and 120 μs, respectively.

Next, an example of access contention information stored in the AP 101 (storage unit 13) will be described with reference to FIG. 5.

The access contention information includes information in correlation with each STA, such as information indicating whether communication is being performed in the EDCA communication period, the type of access category, the average value of data transmission waiting time, and the frequency of occurrence of data-transmission wait per unit time. That is, this information is gathered from each STA.

Also stored in the storage unit 13 of AP 101 is information of the overall system (namely the overall system information) obtained by aggregating the access contention information of each of the STAs. The overall system information is created in order to detect the occurrence of access contention in the system. CPU 14 (information acquisition unit 31) performs the aggregation operation as set forth above. The access contention information is updated during the communication period. In terms of the frequency thereof, this is carried out at regular time intervals, by way of example.

Figure 5:
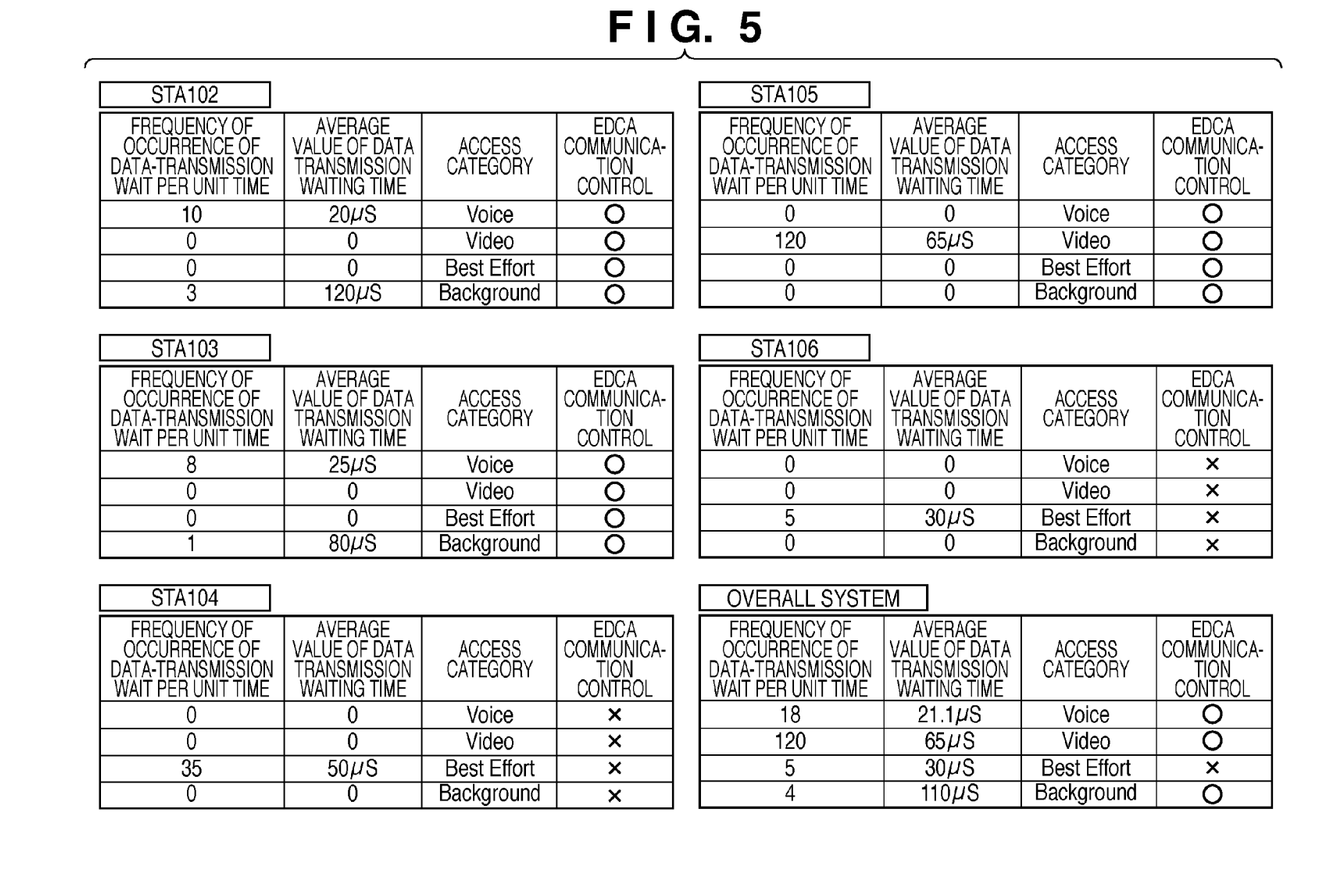
FIG. 5 is a diagram illustrating an example of access contention information stored in an AP 101 (storage unit 13)

The overall system information shown in FIG. 5 is the result of aggregating the information from each of the STAs. This information is criteria as to whether communication control will be performed or not. For example, assume that a determination that there is little communication band available is made if a transmission waiting time of 20 μs or greater occurs ten times or more per unit time. In this case, a state is attained in which the threshold value is exceeded during the EDCA communication control period (namely during the first communication period). Accordingly, the AP 101 recognizes that there is little communication band available (see step S105) and begins executing the processing shown in FIG. 3. Updating of the length of the communication period is performed as a result.

In accordance with the first embodiment, as described above, the communication bandwidth (frequency bandwidth) of the period in which contention access control is performed is increased (a first change is made) in dependence upon the state of access contention, and therefore the occurrence of access contention can be reduced. Further, the communication bandwidth of the period in which contention access control is performed is increased without increasing the bandwidth of the period in which non-contention access control is carried out. As a result, interference with adjacent channels can be alleviated.

Furthermore, by increasing the communication bandwidth of the period in which contention access control is performed, the ratio, within the unit time, between the length of time of the period in which contention access control is executed and the length of time of the period in which non-contention access control is executed can be changed (this is a second change). In this way the interference with adjacent channels can be alleviated and occurrence of access contention reduced. As a result, even if another wireless communication system has been disposed nearby, radio-channel interference with this other wireless communication system can be reduced.

(Second Embodiment)

A second embodiment will be described next. Since the components of the second embodiment are similar to those of the first embodiment, these need not be described again. The description below will focus primarily on how this embodiment differs from the first embodiment. The difference resides in the communication control processing described above in conjunction with FIG. 3.

An example of communication control processing according to the second embodiment will be described with reference to FIG. 6. It should be noted that the processing of steps S201 to S205 in FIG. 6 corresponds to steps S101 to S105 in FIG. 3 and is the same processing. Accordingly, the processing from step S206 onward will be described here.

The AP 101 causes the determination unit 32 to determine the relationship between a communication period in which communication control other than that of EDCA is being performed and a prescribed threshold value (prescribed period) under the conditions of the system at the present time. It should be noted that a period in which communication control other than that of EDCA is being performed includes the HCCA communication period. Further, a period in which communication control by EDCA is performed and a period in which communication control by a DCF (Distributed Coordination Function) is performed may be handled as equivalent communication control periods.

If the result of the determination is that the period in which communication control other than that of EDCA is performed is shorter than the prescribed threshold value ("YES" at step S206), the AP 101 causes the communication control unit 33 to extend the band in the EDCA communication period (step S207). In other words, if the period in which ECDA communication control is being performed in long, then the communication control unit 33 extends the frequency band of the EDCA communication period. More specifically, the communication control unit 33 extends (changes from 20 MHz to 40 MHz, by way example) the bandwidth of the radio channel used only in the period in which communication control by EDCA is being performed. Further, since the band in the EDCA period has been extended, the communication period in which communication control other than that of EDCA is being performed is lengthened per unit time and the communication period in which communication control by EDCA is being performed is shortened per unit time (step S208). This processing is then terminated.

On the other hand, if the communication period in which communication control other than that of EDCA is performed is longer than the prescribed threshold value ("NO" at step S206), then the AP 101 causes the communication control unit 33 to extend the band in the communication period other than that of EDCA (step S209). More specifically, the communication control unit 33 extends (changes from 20 MHz to 40 MHz, by way example) the bandwidth of the radio channel used only in the period in which communication control other than that of EDCA is being performed. Further, the communication period in which communication control other than that of EDCA is being performed is shortened per unit time and the communication period in which communication control by EDCA is being performed is lengthened per unit time (step S210). This processing is then terminated.

A method of extending the communication band at step S106 (first embodiment) shown in FIG. 3 and at steps S207 and S209 shown in FIG. 6 will be described in simple terms with reference to FIG. 7.

Figure 7:
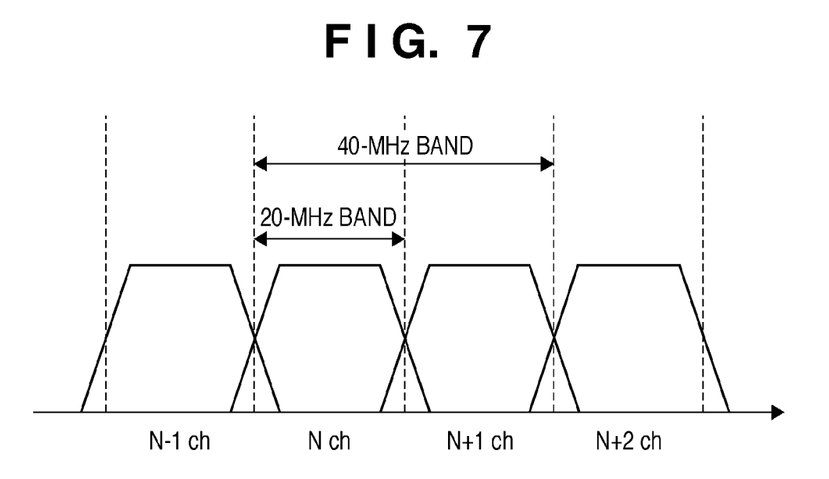
FIG. 7 is a diagram illustrating an example of a method of extending communication band at S207 and S209 shown in FIG. 6.

FIG. 7 illustrates an example of arrangement of radio channels. The horizontal axis indicates the frequency of a carrier. The frequency rises along the direction of the arrow (toward the right in FIG. 7). Radio channels are divided into 20-MHz units, and there is one channel per unit. In a case where the communication band is extended, two successive radio channels, for example [an Nth channel and (N+1)th channel, by way of example] are combined. As a result, the communication band is extended to a frequency band equivalent to two channels.

Figure 6:
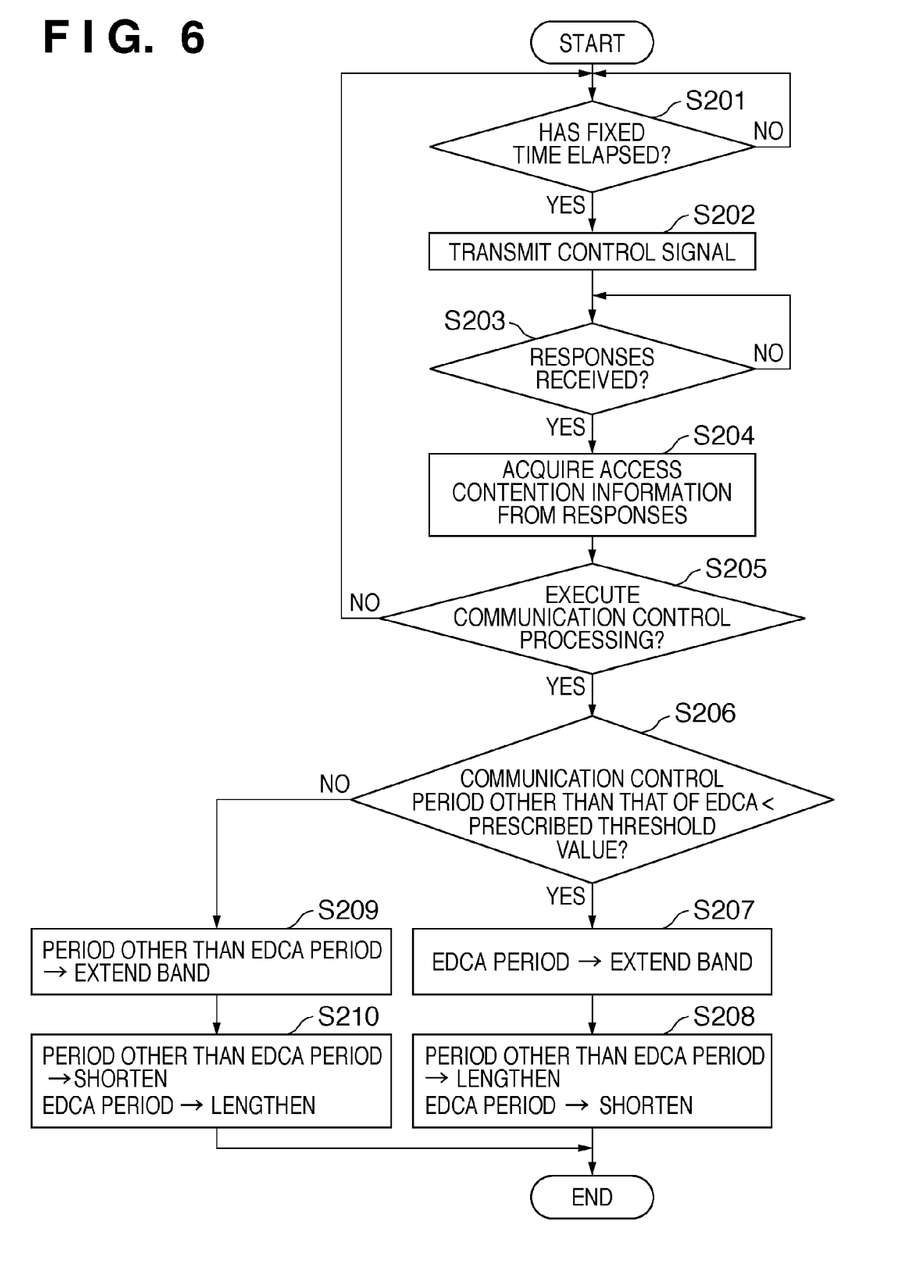
FIG. 6 is a flowchart illustrating an example of communication control processing according to a second embodiment.
Figure 8:
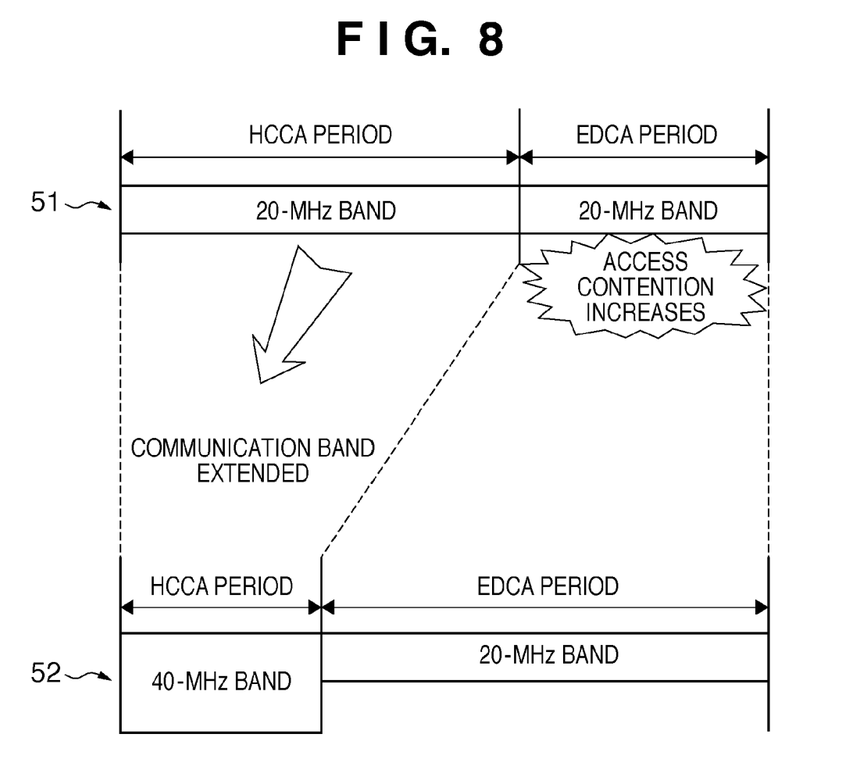
FIG. 8 is a diagram illustrating an example of a change in communication band and communication period when processing of steps S209 and S210 shown in FIG. 6 is executed.

Next, the changes in communication band and communication period when the processing of steps S209 and S210 shown in FIG. 6 is executed will be described with reference to FIG. 8, which is a diagram illustrating communication bands and communication periods used per unit time.

Assume here that communication control by EDCA and communication control by HCCA is being carried out using the 20-MHz communication band. Reference numerals 51 and 52 indicate the states that exist before and after the execution of the processing of steps S209 and S210, respectively.

The state 51 indicates one in which the period in which communication control by EDCA is being performed is shorter than the period in which communication control by HCCA is being performed and, moreover, in which the period in which communication control by HCCA is being performed is longer than a prescribed threshold value. Now assume that under these conditions, it is determined that access contention exceeding a threshold value has occurred during the period in which communication control by EDCA is being performed. When such a determination is made, control is carried out for extending the radio channel only in the period in which communication control by HCCA is being performed.

By executing such control, state 52 is attained. The state 52 indicates one in which the communication band in the period in which communication control by HCCA is being performed has been extended satisfactorily and the necessary communication period has been shortened. The period (EDCA communication period) in which the communication band is not extended has had its length increased. Since this period does not occupy a radio channel of another wireless communication system situated nearby, any influence upon this other wireless communication system can be minimized.

Figure 9:
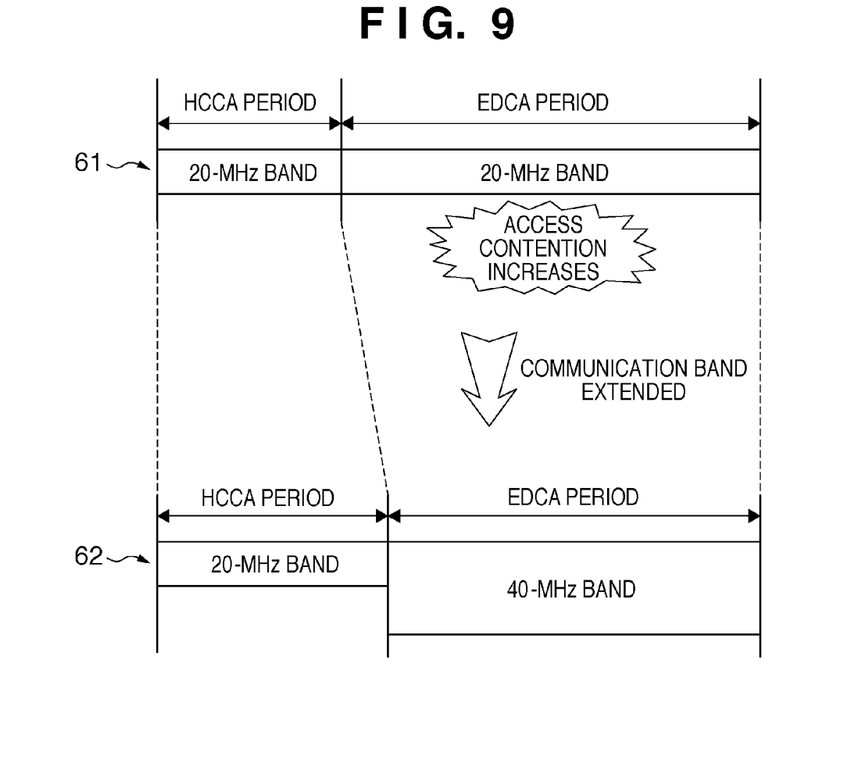
FIG. 9 is a diagram illustrating an example of a change in communication band and communication period when processing of steps S207 and S208 shown in FIG. 6 is executed.

Next, the changes in communication band and communication period when the processing of steps S106 and S107 (first embodiment) shown in FIG. 3 and the processing of steps S207 and S208 shown in FIG. 6 are executed will be described with reference to FIG. 9, which is a diagram illustrating communication bands and communication periods used per unit time.

Assume here that communication control by EDCA and communication control by HCCA is being carried out using the 20-MHz communication band. Reference numerals 61 and 62 indicate the states that exist before and after the execution of the processing of steps S106, S107, S207 and S208, respectively.

The state 61 indicates one in which the period in which communication control by EDCA is being performed is longer than the period in which communication control by HCCA is being performed and, moreover, in which the period in which communication control by HCCA is being performed is shorter than a prescribed threshold value. Now assume that under these conditions, it is determined that access contention exceeding a threshold value has occurred during the period in which communication control by EDCA is being performed. When such a determination is made, control is carried out for extending the radio channel only in the period in which communication control by EDCA is being performed.

By executing such control, state 62 is attained. The state 62 indicates one in which the communication band in the period in which communication control by EDCA is being performed has been extended satisfactorily and the necessary communication period has been shortened. The period (HCCA communication period) in which the communication band is not extended has had its length increased. Since this period does not occupy a radio channel of another wireless communication system situated nearby, any influence upon this other wireless communication system can be minimized.

It should be noted that there are also cases where access contention increases not by an increase in number of STAs but owing to an increase in communication band necessary for data transmission. In such cases, however, it is considered that the EDCA communication period can be set to a short length as a result of the communication band being extended. The period in which communication control by HCCA is performed, therefore, will be extended.

In accordance with the second embodiment, as described above, the communication band in the period in which contention access control is performed and in the period in which non-contention access control is performed, as well as the period length per unit time, is changed. As a result, effects similar to those of the first embodiment are obtained.

That is, when the period in which non-contention access control is performed becomes larger than a prescribed threshold value, the communication bandwidth of the period in which non-contention access control is performed is increased. As a result, the occurrence of access contention can be reduced.

Further, since the communication bandwidth of the period in which non-contention access control is performed is increased without increasing the communication bandwidth of the period in which contention access control is performed, interference with adjacent channels can be alleviated. Furthermore, by increasing the communication bandwidth of the period in which non-contention access control is performed, the ratio, within the unit time, between the length of the period in which contention access control is performed and the length of the period in which non-contention access control is performed can be changed. This makes it possible to alleviate interference with adjacent channels.

The foregoing are examples of typical embodiments of the present invention. However, the present invention is not limited to the embodiments indicated in the foregoing description and drawings and can be modified within the scope of the claims without altering the gist of the invention.

Figure 3:
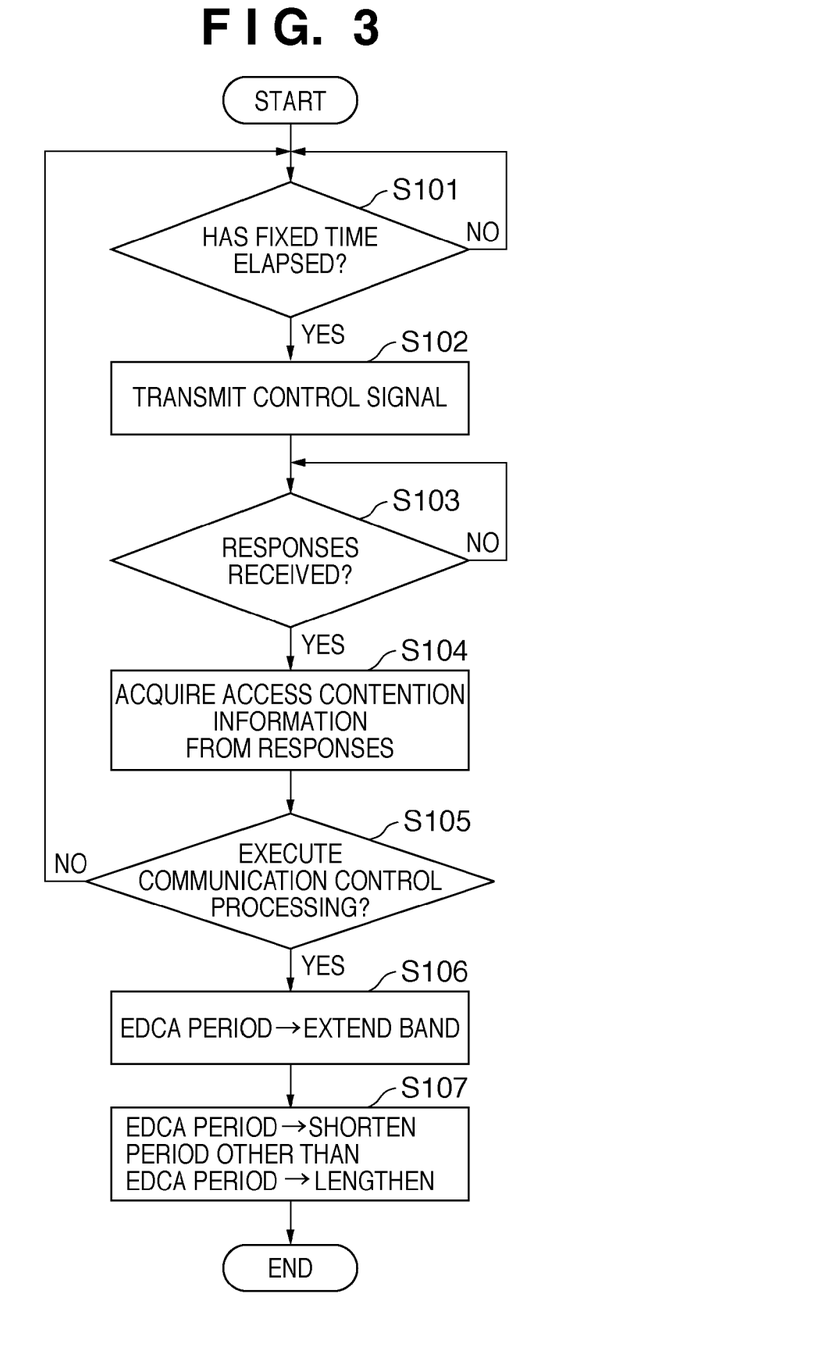
FIG. 3 is a flowchart illustrating an example of communication control processing in an AP 101 shown in FIG. 1.

For example, in the determination processing at step S105 in FIG. 3 and at step S205 in FIG. 6, it may be arranged so that the threshold value is weighted by access category and the determination is made based upon the weighted threshold value. An example of threshold values in this case will be described with reference to FIG. 10.

Figure 10:
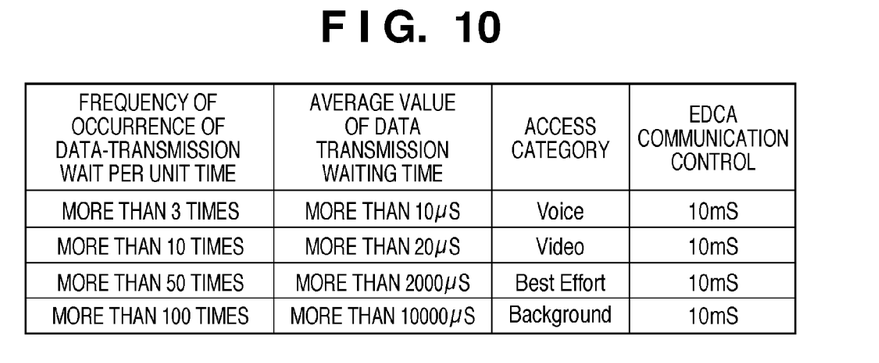
FIG. 10 is a diagram illustrating an example of modification of a threshold value.

In accordance with the set values shown in FIG. 10, if the data type is Voice, for example, the AP 101 determines whether an STA exists that satisfies at least one of a frequency of occurrence of data-transmission wait of three times or more and an average waiting time of 10 μs or more. If the result of the determination is that such an STA exists, then the AP 101 determines that communication control processing (extension of the communication band, for example) is to be executed. Further, if the data type is Background, the AP 101 determines whether an STA exists that satisfies at least one of a frequency of occurrence of data-transmission wait of 100 times or more and an average waiting time of 10,000 μs or more. If the result of the determination is that such an STA exists, then the AP 101 determines that communication control processing (extension of the communication band, for example) is to be executed.

Thus, in a case where weighting of the threshold value is performed in conformity with the access category, communication control processing executed can be made to differ between that for high-priority data communication and that for data communication that is not high priority. As a result, communication control conforming to data type can be carried out.

Further, with regard to the set values shown in FIG. 10, a threshold value is provided also with respect to a period in which communication control other than that of EDCA is performed. This threshold value is used in order to determine whether to extend the communication band of either the EDCA period or the period (HCCA period) other than that of EDCA. Even if the HCCA communication period is 8 ms, the communication period in which band extension is performed becomes the EDCA communication period.

In accordance with the present invention, interference with adjacent channels can be suppressed and the occurrence of access contention reduced.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123542, filed on May 21, 2009, which is hereby incorporated by reference herein in its entirety.

What is claimed is:

1. A communication apparatus comprising:
a communication unit configured to communicate by switching between a first communication period in which contention access control is performed and a second communication period in which non-contention access control is performed, wherein a first frequency bandwidth is used for a respective communication in the first communication period and the second communication period;
a determination unit configured to determine the state of access contention in the first communication period;
a first changing unit configured to change a frequency bandwidth used for communication in the second communication period and not to change a frequency bandwidth used for communication in the first communication period in case that the first communication period is shorter than the second communication period and access contention exceeding a predefined threshold has occurred in the first communication period, or to change the frequency band used for the communication of the first communication period and not to change the frequency band used for the communication of the second communication period in case that the first communication period is longer than the second communication period and access contention exceeding a predefined threshold has occurred in the first communication period; and
a second changing unit configured to change a length of a communication period, which is either the first communication period or the second communication period and for which the frequency bandwidth has been changed by said first changing unit, from the length of the communication period used prior to changing the frequency bandwidth.

2. The apparatus according to claim 1, wherein said first changing unit increases the frequency bandwidth used for the communication of the first or second communication period.

3. The apparatus according to claim 2, wherein said second changing unit shortens the length of the communication period from the length of the communication period before changing the frequency bandwidth, wherein the frequency bandwidth used for the communication period is increased by said first changing unit.

4. The apparatus according to claim 1, wherein said first changing unit changes the frequency bandwidth of the first or second communication period in accordance with length of the first or second communication period.

5. The apparatus according to claim 1, wherein said determination unit determines the state of access contention of another communication apparatus that communicates via the apparatus of claim 1.

6. The apparatus according to claim 1, wherein this apparatus is a base station.

7. The apparatus according to claim 1, wherein said determination unit determines the state of access contention for every type of data.

8. A method of controlling a communication apparatus for communicating by switching between a first communication period in which contention access control is performed and a second communication period in which non-contention access control is performed, wherein a first frequency bandwidth is used for a respective communication in the first communication period and the second communication period, the method comprising the steps of:
- determining the state of access contention in the first communication period;
- changing a frequency bandwidth used for communication in the second communication period and not changing a frequency bandwidth used for communication in the first communication period in case that the first communication period is shorter than the second communication period and access contention exceeding a predefined threshold has occurred in the first communication period, or changing the frequency band used for the communication of the first communication period and not changing the frequency band used for the communication of the second communication period in case that the first communication period is longer than the second communication period and access contention exceeding a predefined threshold has occurred in the first communication period; and
- changing a length of a communication period, which is the first or second communication period and for which the frequency bandwidth has been changed by said first changing unit, from the length of the communication period used prior to changing the frequency bandwidth.

9. A non-transitory medium encoded with a program for causing a computer, which is incorporated within a communication apparatus for communicating by switching between a first communication period in which contention access control is performed and a second communication period in which non-contention access control is performed, wherein a first frequency bandwidth is used for a respective communication in the first communication period and the second communication period, to function as:
- a determination unit configured to determine the state of access contention in the first communication period;
- a first changing unit configured to change a frequency bandwidth used for communication in the second communication period and not to change a frequency bandwidth used for communication in the first communication period in case that the first communication period is shorter than the second communication period and access contention exceeding a predefined threshold has occurred in the first communication period, or to change the frequency band used for the communication of the first communication period and not to change the frequency band used for the communication of the second communication period in case that the first communication period is longer than the second communication period and access contention exceeding a predefined threshold has occurred in the first communication period; and
- a second changing unit configured to change a length of a communication period, which is the first or second communication period and for which the frequency bandwidth has been changed by said first changing unit, from the length of the communication period used prior to changing the frequency bandwidth.

10. The apparatus according to claim 1, wherein said determination unit determines the state of access contention in the first communication period in accordance with data transmission waiting time or occurrence frequency of data transmission wait in the first communication period.

11. The apparatus according to claim 1, wherein said second changing unit changes lengths of the first communication period and the second communication period from that before changing the frequency bandwidths.

12. The apparatus according to claim 1, wherein said second changing unit changes a ratio of the communication periods between the first communication period and the second communication period from that before changing the frequency bandwidths.

13. The apparatus according to claim 12, wherein said second changing unit changes the ratio of the communication periods between the first communication period and the second communication period so that the total length of the first communication period and the second communication period is maintained even after changing the frequency bandwidth.

14. The apparatus according to claim 1, wherein said communication unit performs wireless communication.

* * * * *